(12) United States Patent
Li et al.

(10) Patent No.: US 12,130,239 B2
(45) Date of Patent: Oct. 29, 2024

(54) CONSTRUCTION INSPECTION ROBOTIC SYSTEM AND METHOD THEREOF

(71) Applicants: Bingbing Li, Singapore (SG); I-Ming Chen, Singapore (SG)

(72) Inventors: Bingbing Li, Singapore (SG); I-Ming Chen, Singapore (SG)

(73) Assignee: I-Ming Chen, Taipei (TW)

( * ) Notice: Subject to any disclaimer, the term of this patent is extended or adjusted under 35 U.S.C. 154(b) by 805 days.

(21) Appl. No.: 17/233,673

(22) Filed: Apr. 19, 2021

(65) Prior Publication Data

US 2021/0310960 A1 Oct. 7, 2021

Related U.S. Application Data

(63) Continuation of application No. PCT/CN2018/111725, filed on Oct. 24, 2018.

(30) Foreign Application Priority Data

Oct. 19, 2018 (CN) .......................... 201811224838.3

(51) Int. Cl.
*G01N 21/88* (2006.01)
*B25J 5/00* (2006.01)
(Continued)

(52) U.S. Cl.
CPC .......... *G01N 21/8851* (2013.01); *B25J 5/007* (2013.01); *B25J 9/162* (2013.01); *B25J 9/1697* (2013.01); *B25J 11/00* (2013.01); *G05D 1/0248* (2013.01); *G05D 1/0255* (2013.01); *G05D 1/0278* (2013.01); *G08C 17/02* (2013.01); *H04N 23/695* (2023.01)

(58) Field of Classification Search
CPC ....... G01N 21/8851; B25J 5/007; B25J 9/162; B25J 9/1697; B25J 11/00; G05D 1/0248; G05D 1/0255; G05D 1/0278; H04N 23/695; G08C 17/02
See application file for complete search history.

(56) References Cited

U.S. PATENT DOCUMENTS

| | | | |
|---|---|---|---|
| 2013/0041508 A1* | 2/2013 | Hu | ........................... B25J 9/162 901/47 |
| 2015/0148949 A1* | 5/2015 | Chin | ...................... B25J 13/006 700/245 |

(Continued)

FOREIGN PATENT DOCUMENTS

| | | |
|---|---|---|
| CN | 106003064 A | 10/2016 |
| CN | 106018417 A | 10/2016 |
| KR | 20120011592 A | 2/2012 |

*Primary Examiner* — Sunghyoun Park (57) ABSTRACT

A construction inspection robotic system and method thereof, it may autonomously implement the inspection for construction finish quality, generate a visual report, which is time-saving, labor-saving, and greatly saving the inspection cost, implement a comprehensive inspection for the construction surface problems, and ensure 100% coverage for the construction; it conforms to the same standards for the construction inspection and ensures the consistency of inspection; it instantaneously records and uploads the original inspection data, instantaneously stores and uploads the original inspection data, thus providing original data reference for disputes possibly caused by inspection results.

16 Claims, 3 Drawing Sheets

(51) Int. Cl.
 *B25J 9/16* (2006.01)
 *B25J 11/00* (2006.01)
 *G05D 1/00* (2006.01)
 *G08C 17/02* (2006.01)
 *H04N 23/695* (2023.01)

(56) References Cited

U.S. PATENT DOCUMENTS

| | | | |
|---|---|---|---|
| 2015/0190925 A1* | 7/2015 | Hoffman | B25J 9/1689 |
| | | | 901/47 |
| 2018/0311822 A1* | 11/2018 | Kaminka | B25J 9/1682 |
| 2019/0034864 A1* | 1/2019 | Skaff | G06Q 10/087 |
| 2020/0019167 A1* | 1/2020 | Alshamrani | G05D 1/101 |

* cited by examiner

CONSTRUCTION INSPECTION ROBOTIC SYSTEM AND METHOD THEREOF

CROSS-REFERENCE TO RELATED APPLICATIONS

The present application is a Continuation Application of PCT application No. PCT/CN2018/111725 filed on Oct. 24, 2018, which claims the benefit of Chinese Patent Application No. 201811224838.3 filed on Oct. 19, 2018. The contents of the above-identified applications are hereby incorporated by reference.

FIELD OF THE DISCLOSURE

The present disclosure relates to the field of autonomous inspection of construction quality, in particular, a robotic system and a method for inspecting the construction quality.

BACKGROUND OF THE DISCLOSURE

In the construction industry, it generally requires to perform comprehensive inspection and assessment on construction quality before project hand-over, particularly inspection on defects such as wall cracks, unevenness and empty drum. In the global construction market, different countries and companies often have different inspection standards and assessment methods for construction quality.

The existing construction quality inspection methods mainly comprise steps of manually sampling, analyzing with professional instruments at an inspection station, and performing on-site sampling inspection by using simple tools such as an angle square, a levelling meter and a taping rod. And construction quality such as evenness, wall cracks and the like cannot be sampled to an inspection station for analysis and has to be on-site inspected. Therefore, the construction quality inspection is labor-intensive and repetitive and requires high professional technical skills for practitioners. The following problems exist for on-site sampling inspection: (1) subjective difference: each inspector may have his own subjective cognition and assessment for construction quality problems such as flatness, color consistency and the like, so the inspection results inevitably have subjective difference. (2) Lack of quantized data: most of the existing inspection means and tools can only provide inspection results qualitatively, which cannot give quantitative data of construction quality and cannot correspond and correlate construction defects with spatial position information. (3) Simple and crude tool: the lack of means and tools for digitization and informatization makes it substantially impossible to reproduce the inspection process and results. (4) Incapable of comprehensive inspection: it takes huge manpower cost for the comprehensive inspection, and only sampling inspection can be realized in the industry at present, so that defects such as hollowness and the like are likely to be skipped in the inspection process.

The construction quality is crucial to the waterproofing, moistureproofing, thermal insulation and fireproofing of constructions. Existing construction quality inspection techniques are yet to be improved and developed.

SUMMARY OF THE DISCLOSURE

The disclosure aims to provide a construction inspection robotic system and method thereof, and aims to solve the problems that the existing manual construction quality sampling inspection has, which are, lack of quantitative data, utilizing simple and crude tools, and incapable of comprehensive inspection.

The technical solution of the disclosure is as follows:

A construction inspection robotic system suitable for surface finish quality inspection of residential/commercial constructions, comprising:
  a movable platform used for supporting and driving the whole construction quality inspection robotic system to implement autonomous movement;
  a movable platform used for supporting and driving the whole construction quality inspection robotic system to implement autonomous movement;
  a positioning device used for positioning the movement of the construction quality inspection robotic system and provided on the movable platform;
  an inspecting device used for inspecting the construction quality and provided on the movable platform;
  a control structure used for controlling the whole construction quality inspection robotic system and provided on the movable platform;
  the positioning device and inspecting device is both connected with the control structure, and the control structure controls movable platform to implement movement: in the process of implementing movement of the construction quality inspection robotic system, the positioning device feeds back the information of the surrounding environment and the positioning information of the construction quality inspection robotic system to the control structure in real time, and the control structure provides control signals to the movable platform to implement movement according to the task requirement; the inspecting device collects various inspection information and sends the inspection information to the control structure, and the control structure processes the inspection information to obtain an inspection result.

The construction quality inspection robotic system described in the preceding text, wherein, the movable platform comprising a pedestal and moving wheels set beneath the bottom of the pedestal; a driving unit is provided on the pedestal; the power output end of the driving unit is connected with the moving wheels so as to drive the moving wheels to implement that the construction quality inspection robotic system is movable and steerable in the plane; the positioning device and inspecting device is both set on the pedestal.

The construction quality inspection robotic system described in the preceding text, wherein, the positioning device comprising a semi-autonomously positioning structure and a full-autonomously positioning structure, the semi-autonomously positioning structure comprising an ultrasonic positioning sensor for sensing the position of an inspector in real time, and the ultrasonic positioning sensor is provided on the movable platform and forms a certain inclination angle relative to the horizontal plane, and the ultrasonic positioning sensor is connected with the control structure; the full-autonomously positioning structure comprising a 3D laser scanner, a built-in 2D laser scanner, a color/black and white camera, an inertia measuring unit and a GPS positioning unit; the 3D laser scanner and the color/black and white camera is provided at the top of the construction quality inspection robotic system, the 2D laser scanner is built in the construction quality inspection robotic system, the inertia measuring unit and the GPS positioning unit is provided on the construction quality inspection robotic system, and the 3D laser scanner; the built-in 2D laser scanner, the color/black and white camera, the inertia measuring unit and the GPS positioning unit is all connected with the control structure.

The construction quality inspection robotic system described in the preceding text, wherein, the inspecting device comprising a 3D laser scanner, a built-in 2D laser scanner, a color/black and white camera, a gas detector and an electronic detector, the gas detector being provided on movable platform, and the electronic detector being provided on the bottom of the movable platform, the 3D laser scanner, the built-in 2D laser scanner, the color/black and white camera, gas detector and electronic detector all being connected with control structure: acquiring point cloud data of the construction surface for shape and size assessment by using the 3D laser scanner and a built-in 2D laser scanner; acquiring image information of the construction surface for a visual inspection project assessment by using the color/black and white camera; acquiring the voiceprint characteristics of the construction surface for inspection and assessment of the empty drum by using the electronic detector; acquiring gas content information of the internal construction for inspecting and assessment of the harmful gas by using the gas detector; the controller synthesizing the inspection information for processing to obtain an inspection result.

The construction quality inspection robotic system described in the preceding text, wherein, a lifting device is provided on the movable platform, a Z-axis rotating device is provided on the lifting device, an X-axis tilting device is provided on the Z-axis rotating device, an installation frame is provided at the output end of the X-axis tilting device, and the 3D laser scanner, the built-in 2D laser scanner and the color/black-and-white camera is all provided on the installation frame; the lifting device drives the 3D laser scanner, the built-in 2D laser scanner and the color/black-and-white camera to move up and down along the Z axis; the Z-axis rotating device drives the 3D laser scanner, the built-in 2D laser scanner and the color/black-and-white camera to rotate by taking the Z axis as a rotating center, and the X-axis tilting device drives the 3D laser scanner, the built-in 2D laser scanner and the color/black-and-white camera to tilt up and down by taking the X axis as a rotating center; the lifting device, the Z-axis rotating device and the X-axis tilting device is all connected with the control structure.

The construction quality inspection robotic system described in the preceding text, further comprising an inclinometer provided on the movable platform, and the inclinometer is connected to the control structure.

The construction quality inspection robotic system described in the preceding text, further comprising a 4G routing system, and the 4G routing system is connected to the control structure.

The construction quality inspection robotic system described in the preceding text, wherein, a quick-demountable component is provided between the X-axis tilting device and the installation frame.

An inspection method of the construction quality inspection robotic system, comprising the following steps:

S1, the construction quality inspection robotic system moving to an optimal position away from a subject pending inspection;

S2, the inspecting device collecting and sending all inspection information to the control structure, and the control structure processing the inspection information to obtain an inspection result; and S3, outputting an inspection result.

The inspection method of the construction quality inspection robotic system described in the preceding text, wherein, the inspecting device comprising a 3D laser scanner, a built-in 2D laser scanner, a color/black-and-white camera, a gas detector and an electronic detector, and the calibration process of the 3D laser scanner, the built-in 2D laser scanner and the color/black and white camera before inspection is as follows: setting a plane of the inclinometer as a horizontal reference plane of the construction quality inspection robotic system, and measuring the angle between the horizontal reference plane and the actual horizontal plane with the inclinometer; before the inspection started, calibrating the poses of the ultrasonic positioning sensor, the 3D laser scanner, the built-in 2D laser scanner and the color/black-and-white camera according to the horizontal reference plane, namely calibrating the relative angles of the ultrasonic positioning sensor, the 3D laser scanner, the built-in 2D laser scanner and the color/black-and-white camera relative to the horizontal reference plane; in the inspection process, the lifting device, the Z-axis rotating device and the X-axis tilting device drives the 3D laser scanner, the built-in 2D laser scanner, the color/black and white camera to act, making the 3D laser scanner, the built-in 2D laser scanner, the color/black and white camera and the subject pending inspection to form a certain angle, the controller obtains the angle that the ultrasonic positioning sensor, the 3D laser scanner, the built-in 2D laser scanner, and the color/black and white camera rotated in the inspection process by fetching the movement data of the lifting device, the Z-axis rotating device and the X-axis tilting device, then obtaining the angle data between the subject pending inspection and the horizontal reference plane, and finally obtaining the angle between the subject pending inspection and the actual horizontal plane, thus obtaining the levelness and perpendicularity data of subject pending inspection.

The disclosure has the beneficial effects that: the disclosure provides a construction quality inspection robotic system and a method thereof, which can autonomously assess the construction finish quality, and simultaneously generates a visual report, thereby time-saving, labor-saving and greatly saving the inspection cost; which can autonomously implement the comprehensive inspection of the construction surface problems and ensure full coverage rate of the construction; which can autonomously implement the quantitative inspection of the construction surface problems and obtaining the inspection uniformity by conforming to the same standards for the construction inspection; instantaneously recording and uploading the original inspection data, instantaneously storing and uploading the original inspection data, thus providing original data reference for disputes possibly caused by inspection results.

DETAILED DESCRIPTION OF PREFERRED EMBODIMENTS

Reference will now be made in detail to embodiments of the present disclosure, implements of which are illustrated in the accompanying drawings, wherein like reference numerals refer to the same or similar elements or elements having the same or similar functions throughout the whole text. The embodiments described below with reference to the accompanying drawings are illustrative only for the purpose of explaining the present disclosure and are not to be construed as limiting the present disclosure.

In the description of the present disclosure, it is to be understood that the terms "center", "longitudinal", "lateral", "length", "width", "thickness", "upper", "lower", "front", "rear", "left", "right", "vertical", "horizontal", "top", "bottom", "interior", "exterior", "clockwise", "counterclockwise" and the like, indicate orientations or positional relationships based on those shown in the drawings, merely for easy description and simplification of the description, and do not indicate or imply that the device or element referred to has a particular orientation, be constructed in a particular orientation, and be operated, and thus, the terms are not to be construed as limiting the present disclosure. Furthermore, the terms "first" and "second" are used for descriptive purposes only and are not to be construed as indicating or implying relative importance or to implicitly indicate the number of technical features indicated. Thus, features defined as "first" and "second" may explicitly or implicitly include one or more of the described features. In the description of the present disclosure, "a plurality" means two or more unless specifically defined otherwise.

In the description of the present disclosure, it should be noted that, unless otherwise explicitly specified or limited, the terms "mounted," "linked," and "connected" are to be construed broadly and the may be, for example, fixedly connected, detachably connected, or integrally connected; the terms may be mechanically connected, electrically connected or may be in communication with each other; they may be directly connected or indirectly connected through intervening media, or may be connected through two elements or the interaction of two elements. The specific meanings of the above terms in the present disclosure can be understood according to specific situations by those of ordinary skill in the art.

In the present disclosure, unless otherwise explicitly specified or limited, the recitation of a first feature "on" or "under" a second feature may include the recitation of the first and second features being in direct contact, and may also include the recitation that the first and second features are not in direct contact, but are in contact via another feature between them. Also, the first feature "on," "above" and "over" the second feature may include the first feature being directly above and obliquely above the second feature, or simply indicating that the first feature is at a higher level than the second feature. A first feature "below," "under" and "beneath" a second feature comprising the first feature being directly beneath and obliquely beneath the second feature, or simply indicating that the first feature is at a lesser level height than the second feature.

The following disclosure provides many different embodiments or examples for implementing different features of the disclosure. To simplify the disclosure of the present disclosure, specific example components and arrangements are described below. Of course, they are merely examples and are not intended to limit the present disclosure. Moreover, the present disclosure may repeat reference numerals and/or reference letters in the various examples, which have been repeated for purposes of simplicity and clarity and in themselves do not dictate a relationship between the various embodiments and/or configurations discussed. In addition, the present disclosure provides examples of various specific processes and materials, but those ordinary skilled in the art will recognize the application of other processes and/or the use of other materials.

Figure 1:
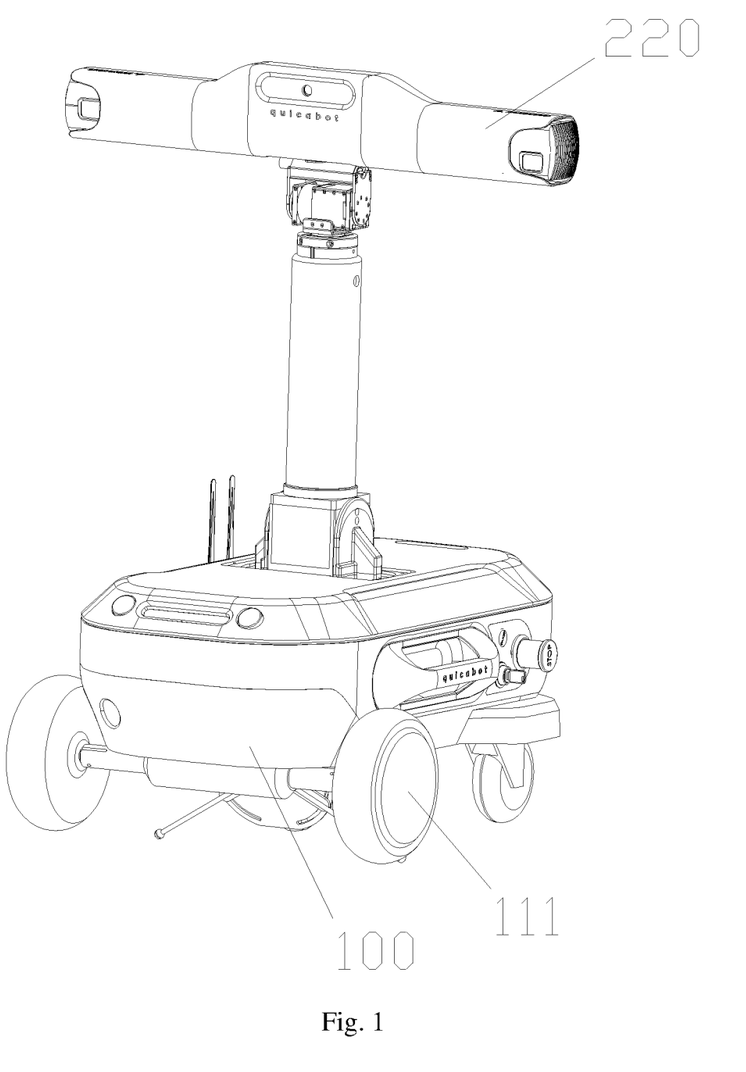
FIG. 1 is a schematic structural view of a construction quality inspection robotic system according to the present disclosure.
Figure 2:
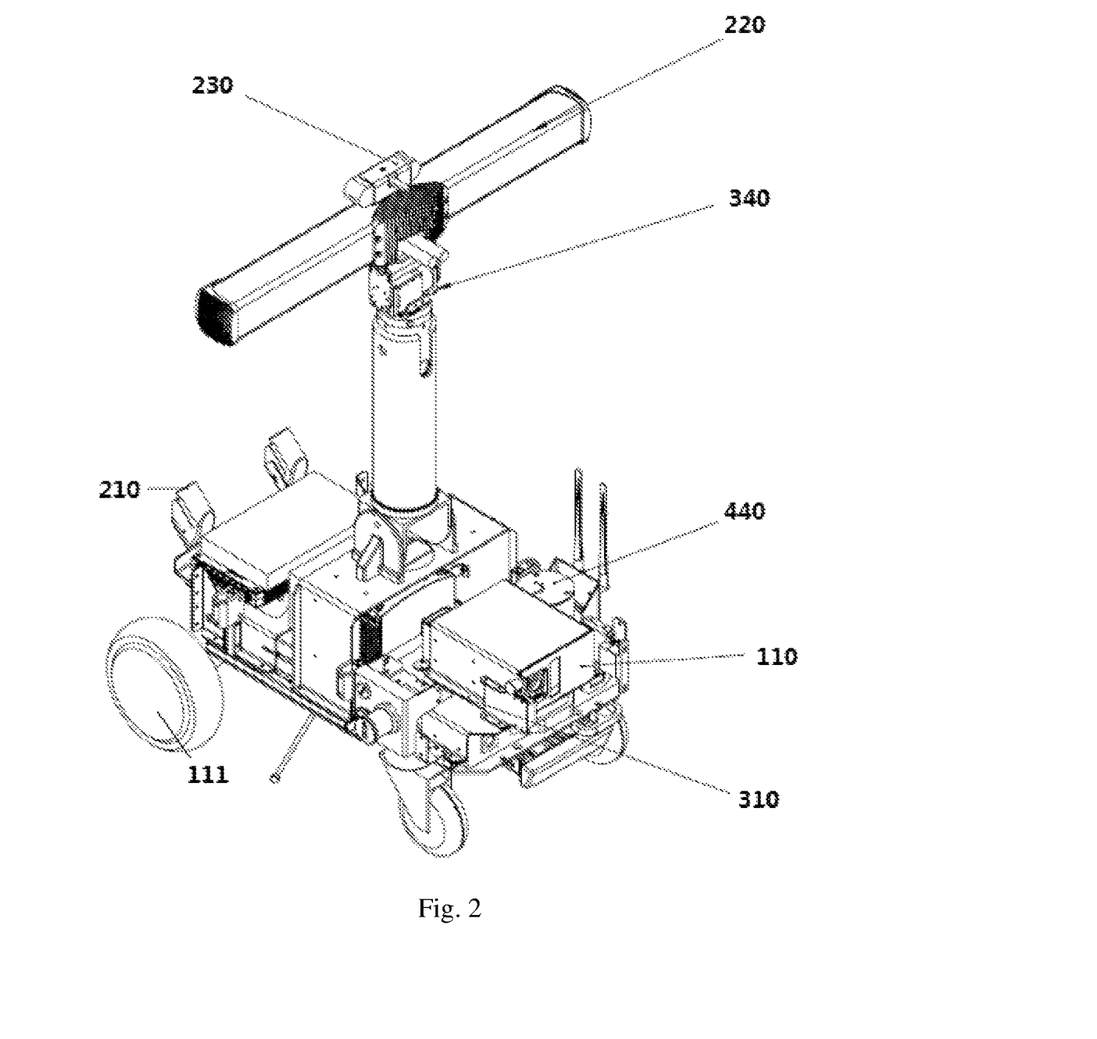
FIG. 2 is an internal structural view of a construction quality inspection robotic system of the present disclosure.
Figure 3:
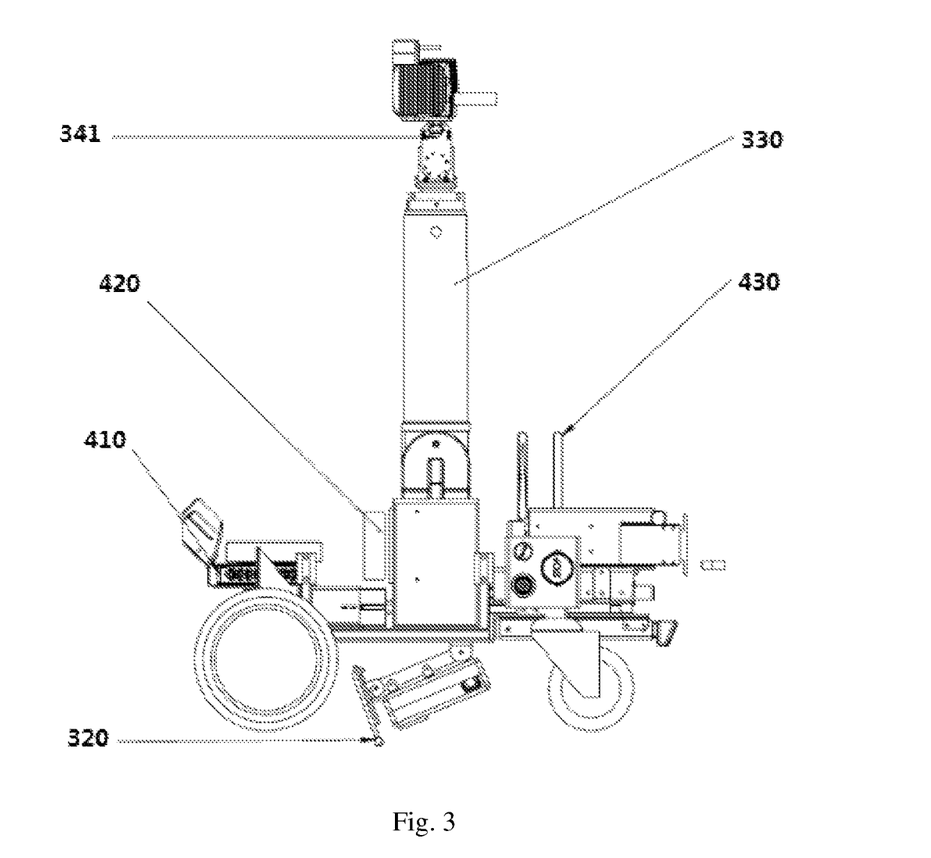
FIG. 3 is a side view of a construction quality inspection robotic system of the present disclosure.

As shown in FIGS. 1 to 3, a construction quality inspection robotic system suitable for surface finish quality inspection in residential/commercial construction, comprises:

a movable platform 100 used for supporting and driving the whole construction quality inspection robotic system to implement autonomous movement;

a positioning device used for positioning the movement of the construction quality inspection robotic system and provided on the movable platform 100;

an inspecting device used for inspecting the quality of the construction and is provided on the movable platform 100;

a control structure for controlling the whole construction quality inspection robotic system, and the control structure is provided on the movable platform 100;

the positioning device and inspecting device all are connected with the control structure, and the control structure control movable platform 100 to implement movement: in the process of implementing movement of the construction quality inspection robotic system, the positioning device feeds back the information of the surrounding environment and the positioning information of the construction quality inspection robotic system to the control structure in real time, and the control structure controls the movable platform to implement movement according to the task requirement; the inspecting device collects various inspection information and sends the inspection information to the control structure, and the control structure processes the inspection information to obtain an inspection result.

Specifically, the control structure comprises a controller 410 and a single chip microcomputer/embedded system 420, the controller 410 is connected to the single chip microcomputer/embedded system 420, the positioning device and the inspecting device is both connected to the single chip microcomputer/embedded system 420, the controller 410 sends an instruction to the single chip microcomputer/embedded system 420, and the single chip microcomputer/embedded system 420 controls the movable platform 100 to move.

Specifically, the movable platform 100 comprises the pedestal and moving wheels 111 sent beneath the pedestal, the positioning device and the inspecting device is provided on the pedestal, a walking power device is set (such as walking motors) on the pedestal, the walking power device is connected with a single chip microcomputer/embedded system 420, and the walking power unit provided on the pedestal; the power output end of the walking power unit being connected with the moving wheels 111 so as to drive the moving wheels to realize that the construction quality inspection robotic system being movable and steerable in the plane; according to the requirement of the inspection task, the walking power device is controlled by the single chip microcomputer/embedded system 420 to drive the moving wheels 111 to move, so that the construction quality inspection robotic system reaches a target inspection position.

Preferably, in order to increase the moving smoothness of the movable platform 100, 4 moving wheels 111 are provided respectively at the 4 corners of the bottom of the pedestal, wherein 2 moving wheels 111 are driving wheels, and the other two moving wheels 111 are universal wheels, so that the movable platform 100 may be smoothly contacted with the ground and can move flexibly.

Further, in order to prevent the inspection effect from being affected by the movement of the movable platform 100 under the action of an external force during the inspection process, an automatic mechanical lock for locking the moving wheels 111 is provided at the bottom of the pedestal, the automatic mechanical lock is connected with the single chip microcomputer/embedded system 420, and the single chip microcomputer/embedded system 420 controls the automatic mechanical lock to lock or unlock the moving wheels 111.

Specifically, the positioning device comprises a semi-autonomously positioning structure and a full-autonomously positioning structure, the semi-autonomously positioning structure comprises an ultrasonic positioning sensor 210 for sensing the position of the inspector in real time, the ultrasonic positioning sensor 210 is set on the movable platform 100, the ultrasonic positioning sensor 210 forms a certain inclination angle with respect to the horizontal plane, the inclination angle may be adjusted according to actual needs (the adjustment of the inclination angle can be implemented through the driving of a motor), the ultrasonic positioning sensor 210 is connected with the single chip microcomputer/embedded system 420, when the movement mode of the construction quality inspection robotic system is selected to be the semi-autonomously movement mode, the ultrasonic positioning sensor 210 senses the position of the inspector in real time and transmits the position data to the single chip microcomputer/embedded system 420, the single chip microcomputer/embedded system 420 feeds back information to the controller 410, and the controller 410 sends an instruction to the single chip microcomputer/embedded system 420 to control the construction quality inspection robotic system to follow the movement implemented by the inspector (namely, when the inspector moves, the construction quality inspection robotic system follows the movement and reaches the position where the inspector reaches); the positioning structure comprises a 3D laser scanner 220, a built-in 2D laser scanner, a color/black-and-white camera 230, an inertial measurement unit (the inertial measurement unit is a device for measuring the three-axis attitude angle (or angular velocity) and acceleration of an object), and a GPS positioning unit, wherein the 3D laser scanner 220 and the color/black-and-white camera 230 is both provided on the top of the construction quality inspection robotic system, the 2D laser scanner is built-in the construction quality inspection robotic system, the inertial measurement unit and the GPS positioning unit are provided on the construction quality inspection robotic system, and the 3D laser scanner 220, the built-in 2D laser scanner, the color/black-and-white camera 230, the inertial measurement unit and the GPS positioning unit are all connected with the single chip microcomputer/embedded system 420: when the movement mode of the construction quality inspection robotic system is selected to be the full-autonomously movement mode, the 3D laser scanner 220, the built-in 2D laser scanner, the color/black-and-white camera 230, the inertia measurement unit and the GPS positioning unit transmits the environmental information around the construction quality inspection robotic system and the position information of the construction quality inspection robotic system to the single chip microcomputer/embedded system 420 in real time, the single chip microcomputer/embedded system 420 feeds back the information to the controller 410, and the controller 410 sends an instruction to the single chip microcomputer/embedded system 420 after processing, so as to control the movable platform 100 to drive the construction quality inspection robotic system to implement autonomous navigation movement. The controller 410 may record the position information of the construction quality inspection robotic system in real time through a positioning device, synchronously corresponds to the real-time construction quality inspection original data for identifying the construction defects and the positions of the construction defects, and save the data in the controller 410.

Specifically, the inspecting device comprises a 3D laser scanner 220, a built-in 2D laser scanner, a color/black-and-white camera 230, a gas detector 310, and an electronic detector 320, the gas detector 310 is provided on the pedestal, the electronic detector 320 is provided at the bottom of the pedestal, and the 3D laser scanner 220, the built-in 2D laser scanner, the color/black-and-white camera 230, the gas detector 310, and the electronic detector 320 are all connected to a single chip/embedded system 420: acquiring the point cloud data of the construction surface for shape and size assessment by using the 3D laser scanner 220 and the built-in 2D laser scanner; acquiring image information of the construction surface for a visual inspection project assessment by using the color/black and white camera 230; acquiring the voiceprint characteristics of the construction surface for inspection and assessment of the empty drum by using the electronic detector 320; acquiring gas content information of the internal construction for inspecting and assessment of the harmful gas by using the gas detector 310; the controller 410 synthesizes the inspection information for processing to obtain an inspection result. The controller 410 may store a plurality of construction quality inspection standards and parameters thereof, and the construction quality inspection robotic system can modify the construction quality inspection standards and parameters thereof according to the specific requirements of the objects to be used, so as to ensure that the inspection operation may follow the specific standards and requirements.

In order to extend the inspection work range of the construction quality inspection robotic system, a lifting device 330 is provided on the pedestal, a Z-axis rotating device is provided on the lifting device 330, an X-axis tilting device 340 is provided on the Z-axis rotating device, an installation frame is provided at the output end of the X-axis tilting device 340, and the 3D laser scanner 220, the built-in 2D laser scanner and the color/black-and-white camera 230 are all provided on the installation frame; the lifting device 330 drives the 3D laser scanner 220, the built-in 2D laser scanner and the color/black-and-white camera 230 to move up and down along the Z axis, the Z-axis rotating device drives the 3D laser scanner 220, the built-in 2D laser scanner and the color/black-and-white camera 230 to rotate by taking the Z axis as a rotating center, and the X-axis tilting device 340 drives the 3D laser scanner 220, the built-in 2D laser scanner and the color/black-and-white camera 230 to tilt up and down by taking the X axis as a rotating center; the lifting device 330, the Z-axis rotating device and the X-axis tilting device 340 are all connected with the single chip microcomputer/embedded system 420: it effectively enlarge the inspection range of the 3D laser scanner 220, the built-in 2D laser scanner and the color/black-and-white camera 230 by using the lifting device 330, the Z-axis rotating device and the X-axis tilting device 340.

Further, the lifting device 330 utilizes a lifting cylinder, and the Z-axis rotating device and the X-axis tilting device 340 may be driven by motors and controlled by the controller 410.

In order to ensure In order to ensure the inspection accuracy and consistency for the levelness and perpendicularity of the ultrasonic positioning sensor 210, the 3D laser scanner 220, the built-in 2D laser scanner, and the color/black-and-white camera 230, the construction quality inspection robotic system further comprises an inclinometer 440 provided on the movable platform 100, and the inclinometer 440 is connected with the single chip microcomputer/embedded system 420: the precision of the inclinometer 440 reaches 0.001 degrees, setting the plane where the inclinometer 440 located lies set as the horizontal reference plane of the construction quality inspection robotic system, and measuring the angle between the horizontal reference plane and an actual horizontal plane with the inclinometer 440; before the inspection started, calibrating the poses of the ultrasonic positioning sensor 210, the 3D laser scanner 220, the built-in 2D laser scanner and the color/black-and-white camera 230 according to the horizontal reference plane, (namely calibrating the relative angles of the ultrasonic positioning sensor 210, the 3D laser scanner 220, the built-in 2D laser scanner and the color/black-and-white camera 230 relative to the horizontal reference plane). By using the inclinometer 440, a horizontal reference plane is provided for inspecting the levelness and perpendicularity so as to ensure the consistency of the measuring result; the ultrasonic positioning sensor 210, the 3D laser scanner 220, the built-in 2D laser scanner and the color/black-and-white camera 230 are calibrated before inspection so as to ensure the measurement accuracy of the levelness and perpendicularity of the ultrasonic positioning sensor 210, the 3D laser scanner 220, the built-in 2D laser scanner and the color/black-and-white camera 23.

Further, the construction quality inspection robotic system can measure the following items: (1) Evenness of wall/ceiling/floor, which is implemented by working with a 3D laser scanner 220, a built-in 2D laser scanner, and a color/black and white camera 230. (2) Levelness of ceiling/floor, which is implemented by working with the inclinometer 440 described in the preceding text. (3) Perpendicularity of wall, which is implemented by working with the inclinometer 440. (3) Juncture size of floor/ceiling/wall, which is implemented by working with a color/black and white camera 230. (4) Included angle of wall, which is implemented by working with the inclinometer 440. (5) Empty drum of Wall/ceiling/floor, which is implemented by working with an electronic detectors 320. (6) Cracks of wall/ceiling/floor, which is implemented by working with a color/black and white camera 230. (7) Overall cleanliness of the construction, which is implemented by working with a color/black and white camera 230. (8) The content of harmful gases (formaldehyde, benzene), which is detected by a gas detector 310.

The construction quality inspection robotic system acquires original information of various detected subjects from the ultrasonic positioning sensor 210, the 3D laser scanner 220, the built-in 2D laser scanner and the color/black and white camera 230, and processes the information based on different algorithms; the construction quality inspection robotic system of the present system also records and encrypts various information (including original information of a subject to be measured, position information of the robot, angle information of the ultrasonic positioning sensor 210, the 3D laser scanner 220, a built-in 2D laser scanner, and the color/black-and-white camera 230, etc.).

In order to extend the endurance of the construction quality inspection robotic system, the construction quality inspection robotic system further comprises two rechargeable batteries 110, wherein the rechargeable batteries 110 are provided on the movable platform 100, and the rechargeable batteries 110 provide power for the whole construction quality inspection robotic system; the rechargeable batteries 110 may be used for charging on site, in other conditions, one rechargeable battery 110 may be used for charging and other one is in operational service.

Further, the construction quality inspection robotic system may also check the usage of the rechargeable battery 110 using a computer-aided control structure, activate an alarm according to the usage or send a message to a supervision system and inform an operator.

In order to make the operating data of the construction quality inspection robotic system's may be in time fed back and shared remotely, the construction quality inspection robotic system further comprises a wireless communication device 430, the wireless communication device 430 is connected with the controller 410, and the controller 410 transmits the encrypted operating data to the cloud platform real-time using the wireless communication device 430, such as battery power, motor information, inspection raw data, etc., and utilizes the cloud platform to perform deep analysis, process, store and share the inspection data.

Preferably, the wireless communication device utilizes a 4G routing system, and the 4G routing system and the cloud platform can implement 4G network communications.

In order to feed the operation data of the construction quality inspection robotic system back to the inspector in time, the construction quality inspection robotic system may be connected with a handheld terminal (the handheld terminal may be a movable phone, a tablet personal computer and the like), the handheld terminal reads the real-time operation data of the construction quality inspection robotic system or inputs an instruction into the construction quality inspection robotic system.

In order to facilitate the carrying of the construction quality inspection robotic system, a quick-detachable component 341 is provided between the X-axis tilting device 340 and the mounting bracket, which makes the 3D laser scanner 220 mounted on the mounting bracket, the built-in 2D laser scanner, and the color/black-and-white camera 230 easily detached by the quick-detachable component 341.

Figure 4:
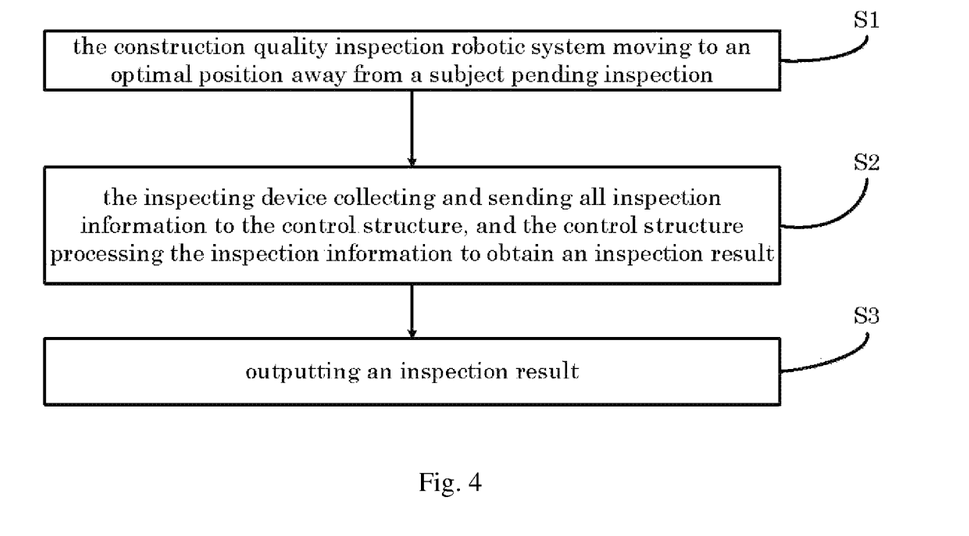
FIG. 4 is a flow chart of the steps of an inspection method of the construction quality inspection robotic system of the present disclosure

As shown in FIG. 4, a method for inspecting the construction quality inspection robotic system as described above specifically comprises the following steps:

S1, moving a construction quality inspection robotic system to an optimal position away from a subject pending inspection;

S2, the inspecting device collects sends all inspection information to a control structure, and the control structure processes the inspection information to obtain an inspection result; and S3, outputting an inspection result.

In some embodiments, the inspecting device comprises a 3D laser scanner 220, an built-in 2D laser scanner, a color/black-and-white camera 230, a gas detector 310, and an electronic detector 320, and the calibration process for the 3D laser scanner 220, the built-in 2D laser scanner, and the color/black-and-white camera 230 before inspection is as follows: setting a plane of the inclinometer 440 as a horizontal reference plane of the construction quality inspection robotic system, and measuring the angle between the horizontal reference plane and the actual horizontal plane with the inclinometer 440; before the inspection started, calibrating the poses of the ultrasonic positioning sensor 210, the 3D laser scanner 220, the built-in 2D laser scanner and the color/black-and-white camera 230 according to the horizontal reference plane, namely calibrating the relative angles of the ultrasonic positioning sensor 210, the 3D laser scanner 220, the built-in 2D laser scanner and the color/black-and-white camera 230 relative to the horizontal reference plane.

In some embodiments, the 3D laser scanner 220, the built-in 2D laser scanner, and the color/black-and-white camera 230 works together to inspect the levelness and perpendicularity of the subject pending inspection, the steps are as follows: in the inspection process, the lifting device 330, the Z-axis rotating device and the X-axis tilting device 340 drives the 3D laser scanner 220, the built-in 2D laser scanner and the color/black-and-white camera 230 to act so that the 3D laser scanner 220, the built-in 2D laser scanner, the color/black-and-white camera 230 and the object pending inspection forms a certain angle, the controller 410 reads the action information of the lifting device 330, the Z-axis rotating device and the X-axis tilting device 340 to acquire the angle been rotated by the ultrasonic positioning sensor 210, the 3D laser scanner 220, the built-in 2D laser scanner and the color/black-and-white camera 230 in the inspection process, and acquire the angle between the object pending inspection and the horizontal reference plane, and finally acquire the angle between the object pending inspection and the actual horizontal plane, thereby acquiring the levelness and perpendicularity of the object pending inspection.

Compared with the prior art, the present disclosure has the following advantages:

(1) The construction quality inspection robotic system may autonomously inspect the construction finish quality, and simultaneously generates a visual report, thus time-saving, labor-saving, highly efficient, and saving inspection cost.

(2) Implementing a comprehensive inspection for the surface problems of the construction, and ensuring 100% coverage rate of the construction.

(3) The method and the device implements the quantitative inspection of the construction surface problems and performs the inspection uniformity by conforming to the same standards for the construction inspection, thus avoiding the subjective errors.

(4) Instantaneously recording and uploading the original inspection data, instantaneously storing and uploading the original inspection data, thus providing original data reference for disputes possibly caused by inspection results.

(5) The inclinometer 440 ensures the measurement accuracy of levelness and perpendicularity.

In the description of the present specification, reference to the description of "one embodiment", "certain embodiments", "illustrative embodiments", "examples", "specific examples", or "some examples" or the like means that a particular feature, structure, material, or characteristic described in connection with the embodiment or example is included in at least one embodiment or example of the disclosure. In this specification, schematic representations of the above terms do not necessarily refer to the same embodiment or example. Furthermore, the features, structures, materials, or characteristics described may be combined in any suitable manner in any one or more embodiments or examples.

It will be understood that the disclosure is not limited to the examples described in the preceding text, but for those skilled in the art, it may be easy to make modifications and variations in light of the above teachings, and that all such modifications and variations are considered to be within the scope of the disclosure as defined by the appended claims.

What is claimed is:

1. A construction inspection robotic system, wherein, comprising:

a movable platform used for supporting and driving the whole construction quality inspection robotic system to implement autonomous movement;

a positioning device used for positioning the movement of the construction quality inspection robotic system and provided on the movable platform;

an inspecting device used for inspecting the construction quality and provided on the movable platform;

a control structure used for controlling the whole construction quality inspection robotic system and provided on the movable platform;

the positioning device and inspecting device is both connected with the control structure, and the control structure controls movable platform to implement movement: in the process of implementing movement of the construction quality inspection robotic system, the positioning device feeds back the information of the surrounding environment and the positioning information of the construction quality inspection robotic system to the control structure in real time, and the control structure controls the movable platform to implement movement according to the task requirement; the inspecting device collects various inspection information and sends the inspection information to the control structure, the inspecting device comprising a 3D laser scanner, a built-in 2D laser scanner, a color/black and white camera, a gas detector and an electronic detector, the gas detector is provided on movable platform, and the electronic detector being provided on the bottom of the movable platform, the 3D laser scanner, the built-in 2D laser scanner, the color/black and white camera, gas detector and electronic detector is all connected with control structure: acquiring point cloud data of the construction surface for shape and size assessment by using the 3D laser scanner and a built-in 2D laser scanner; acquiring image information of the construction surface for a visual inspection project assessment by using the color/black and white camera; acquiring the voiceprint characteristics of the construction surface for inspection and assessment of the empty drum by using the electronic detector; acquiring gas content information of the internal construction for inspecting and assessment of the harmful gas by using the gas detector and the control structure processes the inspection information to obtain an inspection result.

2. The construction inspection robotic system according to claim 1, wherein, the movable platform comprising a pedestal and moving wheels set beneath the bottom of the pedestal; a walking power unit is provided on the pedestal; the power output end of the walking power unit is connected with the moving wheels so as to drive the moving wheels to implement that the construction quality inspection robotic system is movable and steerable in the plane; the positioning device and inspecting device is both set on the pedestal.

3. The construction inspection robotic system according to claim 2, wherein, 4 moving wheels are provided respectively at the 4 corners of the bottom of the pedestal, 2 moving wheels 111 are driving wheels, and the other two are universal wheels.

4. The construction inspection robotic system according to claim 2, wherein, an automatic mechanical lock for locking the moving wheels is provided at the bottom of the pedestal, the automatic mechanical lock is connected with the single chip microcomputer/embedded system, and the single chip microcomputer/embedded system controls the automatic mechanical lock to lock or unlock the moving wheels.

5. An inspection method of the construction quality inspection robotic system according to claim 2, wherein, comprising the following steps:
- S1, the construction quality inspection robotic system moving to an optimal position away from a subject pending inspection;
- S2, the inspecting device sending all inspection information to the control structure, and the control structure processing the inspection information to obtain an inspection result; and
- S3, outputting an inspection result.

6. The construction inspection robotic system according to claim 1, wherein, a lifting device is provided on the movable platform, a Z-axis rotating device is provided on the lifting device, an X-axis tilting device is provided on the Z-axis rotating device, an installation frame is provided at the output end of the X-axis tilting device, and the 3D laser scanner, the built-in 2D laser scanner and the color/black-and-white camera is all provided on the installation frame; the lifting device drives the 3D laser scanner, the built-in 2D laser scanner and the color/black-and-white camera to move up and down along the Z axis; the Z-axis rotating device drives the 3D laser scanner, the built-in 2D laser scanner and the color/black-and-white camera to rotate by taking the Z axis as a rotating center, and the X-axis tilting device drives the 3D laser scanner, the built-in 2D laser scanner and the color/black-and-white camera to tilt up and down by taking the X axis as a rotating center; the lifting device, the Z-axis rotating device and the X-axis tilting device is all connected with the control structure.

7. The construction inspection robotic system according to claim 6, wherein, further comprising an inclinometer provided on the movable platform, and the inclinometer is connected to the control structure.

8. The construction inspection robotic system according to claim 6, wherein, a quick-demountable component is provided between the X-axis tilting device and the installation frame.

9. The construction inspection robotic system according to claim 1, wherein, further comprising a 4G routing system, and the 4G routing system is connected with the control structure.

10. An inspection method of the construction quality inspection robotic system according to claim 1, wherein, comprising the following steps:
- S1, the construction quality inspection robotic system moving to an optimal position away from a subject pending inspection;
- S2, the inspecting device sending all inspection information to the control structure, and the control structure processing the inspection information to obtain an inspection result; and
- S3, outputting an inspection result.

11. The inspection method of the construction quality inspection robotic system according to claim 10, wherein, the inspecting device comprising a 3D laser scanner, a built-in 2D laser scanner, a color/black-and-white camera, a gas detector and an electronic detector, and the calibration process of the 3D laser scanner, the built-in 2D laser scanner and the color/black and white camera before inspection is as follows: setting a plane of the inclinometer as a horizontal reference plane of the construction quality inspection robotic system, and measuring the angle between the horizontal reference plane and the actual horizontal plane with the inclinometer; before the inspection started, calibrating the poses of the ultrasonic positioning sensor, the 3D laser scanner, the built-in 2D laser scanner and the color/black-and-white camera according to the horizontal reference plane, namely calibrating the relative angles of the ultrasonic positioning sensor, the 3D laser scanner, the built-in 2D laser scanner and the color/black-and-white camera relative to the horizontal reference plane; in the inspection process, the lifting device, the Z-axis rotating device and the X-axis tilting device drives the 3D laser scanner, the built-in 2D laser scanner, the color/black and white camera to act, making the 3D laser scanner, the built-in 2D laser scanner, the color/black and white camera and the subject pending inspection to form a certain angle, the control structure obtains the angle that the ultrasonic positioning sensor, the 3D laser scanner, the built-in 2D laser scanner, and the color/black and white camera rotated in the inspection process by fetching the movement data of the lifting device, the Z-axis rotating device and the X-axis tilting device, then obtaining the angle data between the subject pending inspection and the horizontal reference plane, and finally obtaining the angle data between the subject pending inspection and the actual horizontal plane, thus obtaining the levelness and perpendicularity data of subject pending inspection.

12. The inspection method of the construction quality inspection robotic system according to claim 10, wherein, comprising: acquiring original information of various detected subjects from the ultrasonic positioning sensor, the 3D laser scanner, the built-in 2D laser scanner and the color/black and white camera, and processing the information based on different algorithms; recording and encrypting various information.

13. The construction inspection robotic system according to claim 1, the control structure comprises a controller and a single chip microcomputer/embedded system, the controller is connected to the single chip microcomputer/embedded system, the positioning device and the inspecting device is both connected to the single chip microcomputer/embedded system, the controller sends an instruction to the single chip microcomputer/embedded system, and the single chip microcomputer/embedded system controls the movable platform to move.

14. The construction inspection robotic system according to claim 1, wherein, further comprising a plurality of rechargeable batteries, the rechargeable batteries are provided on the movable platform and used for providing power for the whole construction quality inspection robotic system.

15. The construction inspection robotic system according to claim 14, wherein, a plurality of the rechargeable batteries may be used for charging, meanwhile the others may be in operational service.

16. The construction inspection robotic system according to claim 1, wherein, further comprising a wireless communication device and cloud platform, the wireless communication device is connected with the control structure, the control structure transmits the encrypted operating data to the cloud platform real-time using the wireless communication device, and the cloud platform performs deep analysis, processes, stores and shares the inspection data.

* * * * *